March 24, 1953  H. J. HAMMERLY  2,632,786
MONITOR BOX UNIT FOR BUS BAR DUCT SYSTEMS
Filed April 16, 1949  2 SHEETS—SHEET 1
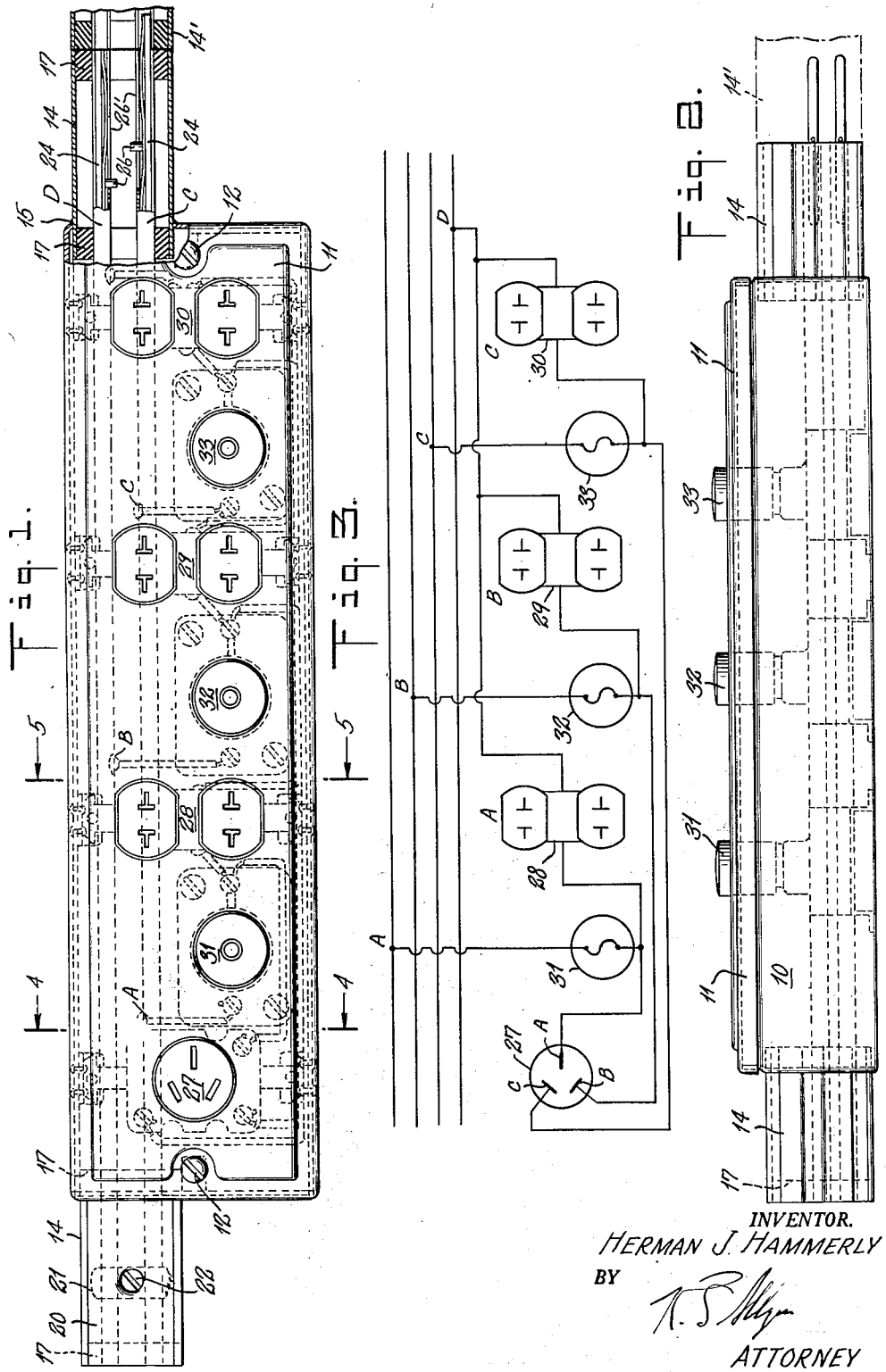
INVENTOR.
HERMAN J. HAMMERLY
BY
ATTORNEY March 24, 1953 — H. J. HAMMERLY — 2,632,786
MONITOR BOX UNIT FOR BUS BAR DUCT SYSTEMS
Filed April 16, 1949 — 2 SHEETS—SHEET 2
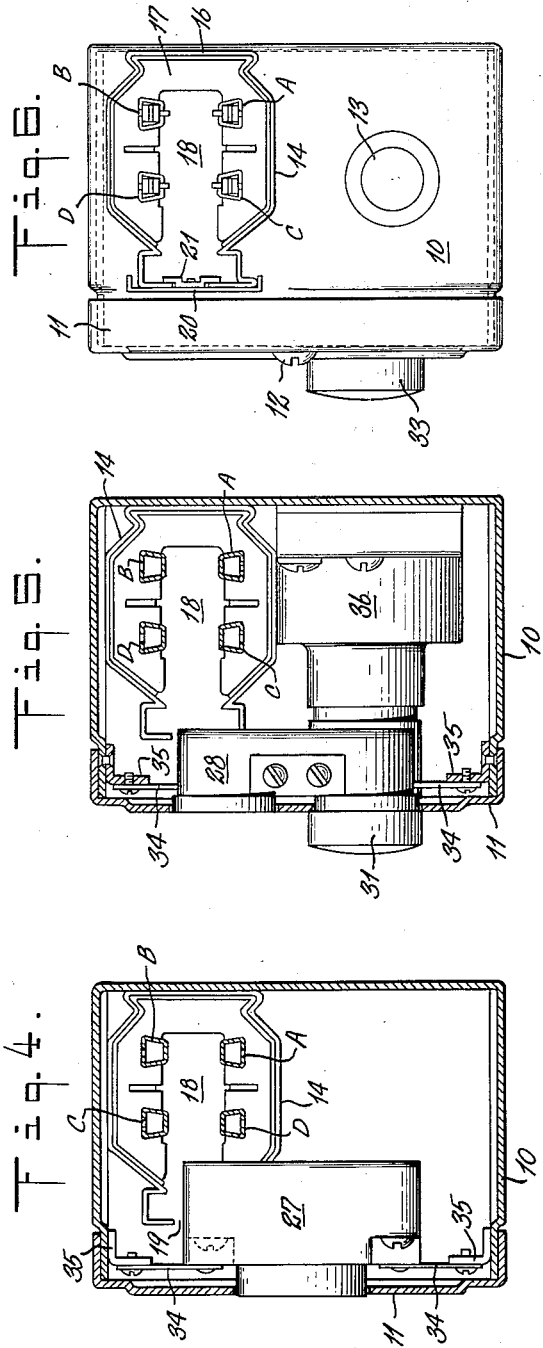
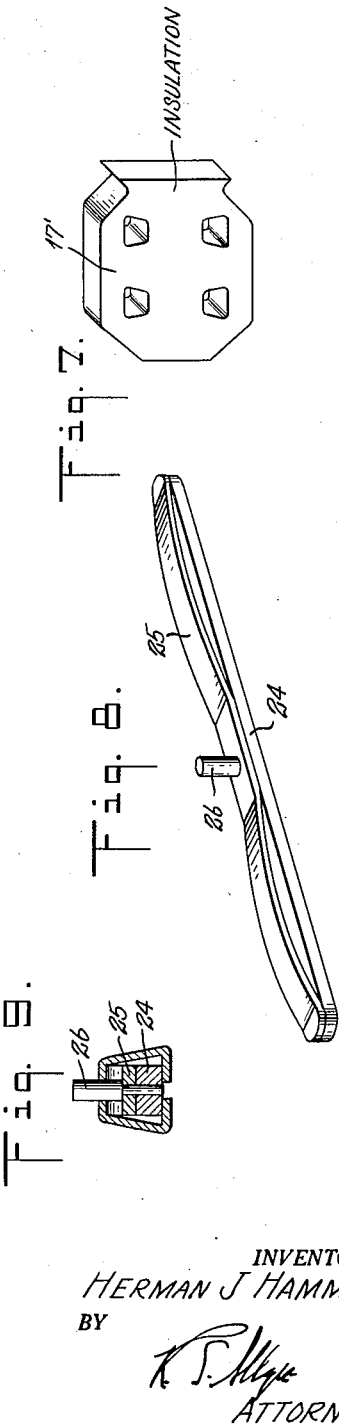
INVENTOR.
HERMAN J HAMMERLY
BY
ATTORNEY Patented Mar. 24, 1953

2,632,786

UNITED STATES PATENT OFFICE 2,632,786

MONITOR BOX UNIT FOR BUS BAR DUCT SYSTEMS

Herman J. Hammerly, Plainville, Conn., assignor, by mesne assignments, to General Electric Company, a corporation of New York Application April 16, 1949, Serial No. 87,950

3 Claims. (Cl. 173—334.1)

My invention relates to a system of electric power distribution of the type set forth in my Patent 2,626,301 of which this is a continuation in part, and particularly to a multipole system.

One object is to provide for conveniently tapping the system in various ways as is sometimes desirable in laboratory uses.

Another object is to provide a unit that can be inserted into any one of several prearranged locations in the distribution system.

Another object is to provide for plugging into a three wire system or connecting to any one of the phases of a three wire system.

Fig. 1 is a plan view of a monitor box unit embodying my invention, part of one end being shown in section.

Fig. 2 is a side view of the same on a somewhat smaller scale and showing in dotted lines the end of a connected duct line.

Fig. 3 is a diagrammatic view of the circuits.

Fig. 4 is a cross sectional view taken on the plane of the line 4—4 of Fig. 1.

Fig. 5 is a cross sectional view taken on the plane of the line 5—5 of Fig. 1.

Fig. 6 is an end view with part broken away.

Fig. 7 is a detail perspective view of an insulating support for the bus bars.

Fig. 8 is a perspective view of one of the jacks for connecting a bus bar to a bus bar duct system.

Fig. 9 is a detail cross sectional view of a bus bar showing one of the jacks in place.

The enclosure or box 10 has a cover 11 which may be held in place by screws 12, 12 and may have suitable knockouts 13 if desired.

At one or both ends is a short bus duct section 14 which may be welded or otherwise secured in place at 15 and 16 in the end of the box.

The bus bars A, B and C represent the three phases of the circuits and bar D the neutral. These bus bars are preferably tubular and of trapezoidal cross section and mounted in insulation 17 at each end of the enclosure and also at each end of the bus duct. When the system is intended to receive plug-in or trolley type collectors a space 18 is provided between the oppositely disposed bus bars and the duct is left open at 19 along its outer face for the insertion of the branch take-off devices. In some cases, the insulation 17' may have spaced holes for the bus bars as shown in Fig. 7.

The jack or connector for joining the meeting ends of respective bus bars is made up of a rigid conducting bar 24 and a two-armed spring contact member 25 pivotally connected by a knob or handle piece 26, as fully described and claimed in my Patent 2,626,298. Each jack slides in a bus bar and the bus bar is slotted at 26' (Fig. 1) to allow for the sliding of the knob 26. Such a monitor or testing box with the four bus bars supported in it constitute a unit which can be inserted into an installed system at any of a prearranged number of locations.

Inside of the box are mounted conventional plug-in takeoff receptacles 27, 28, 29 and 30 and fuse plugs 31, 32 and 33. Each receptacle has a strap 34 at each end detachably mounted on brackets 35 as shown in Fig. 4 on the sides of the box.

It will be seen that the bus bars are located along one side of the box and the fuse plug sockets 36 along the other side of the box. The receptacles are supported along the outer part of the box while the bus bars are in the bottom part of the box.

This arrangement is compact and yet leaves ample room for wiring. Receptacle 27 is of the three contact type having its contacts connected respectively to bus bars A, B and C through the protective fuses 31, 32 and 33.

Receptacle 28 provides for connection in the A phase, 29 in the B phase and 30 in the C phase.

Various other constructions and arrangements may be accomplished according to the invention as herein set forth.

I claim:

1. In a bus duct system a monitor box comprising an enclosure having a cover with openings, abbreviated bus duct sections permanently attached to the opposite ends of said enclosure, bus bars supported in said duct sections and extending through said enclosure along one side, plug-in take-off devices supported in said enclosure and accessible through the openings in the cover and having contacts connected to said bus bars, and fuse plug sockets mounted along the opposite side of the enclosure and accessible through the openings in the cover, said fuse plug sockets being electrically connected between said take-off devices and said bus bars.

2. As an article of manufacture, a portable monitor box unit for a power distribution system comprising an elongated hollow box having a removable cover coextensive with the length of the housing and with spaced openings therein, a hollow extension at each end of the box communicating with the interior thereof and disposed adjacent the top of the box at the rear, spaced insulators in said extensions, spaced parallel bus bars of three different phases extending through said box and extensions and supported by said insulators, a neutral bus bar extending through said box and extensions and supported by said insulators, a plurality of plug-in receptacles supported inside said box at the front thereof with portions protruding through some of the openings in the cover, conductors between said receptacles and said phase bus bars, one of said receptacles having contacts connected to all three of the respective phase bus bars, the other receptacles being connected to the neutral bus bar, and a plurality of fuse sockets supported inside said box at the rear and bottom thereof in line with other openings in the cover and operatively connected to said conductors.

3. As an article of manufacture, a monitor bus unit for a power distribution system comprising a hollow box having a removable cover, a pair of short hollow extensions permanently affixed to said box at opposite ends adjacent the rear thereof, said extensions communicating with the interior of said box, insulators in said extensions, spaced parallel bus bars extending through said box and said extensions and supported by said insulators, a plurality of plug-in receptacles supported inside said box at the front thereof with portions protruding through some of the openings in said cover, conductors connected between said receptacles and said bus bars, and a plurality of fuse sockets supported inside of said box at the rear and bottom thereof in line with other openings in the cover and operatively connected between said receptacles and said bus bars.

HERMAN J. HAMMERLY.

REFERENCES CITED

The following references are of record in the file of this patent:

UNITED STATES PATENTS

| Number | Name | Date |
|---|---|---|
| 1,874,828 | Suss | Aug. 30, 1932 |
| 1,992,816 | De Mask | Feb. 26, 1935 |
| 2,267,745 | O'Brien | Dec. 30, 1941 |
| 2,268,090 | Windsor | Dec. 30, 1941 |
| 2,307,230 | Morten | Jan. 5, 1943 |
| 2,313,960 | O'Brien | Mar. 16, 1943 |
| 2,408,442 | O'Brien | Oct. 1, 1946 |
| 2,430,557 | Carlson | Nov. 11, 1947 |